A. D. PENTZ, Jr.
STERILIZER.
APPLICATION FILED AUG. 7, 1919.

1,430,925.

Patented Oct. 3, 1922.
2 SHEETS—SHEET 1.

A. D. Pentz, Jr.,
Inventor,
By Kerr, Page, Cooper & Hayward,
Attorneys.

A. D. PENTZ, Jr.
STERILIZER.
APPLICATION FILED AUG. 7, 1919.
1,430,925.
Patented Oct. 3, 1922.
2 SHEETS—SHEET 2.
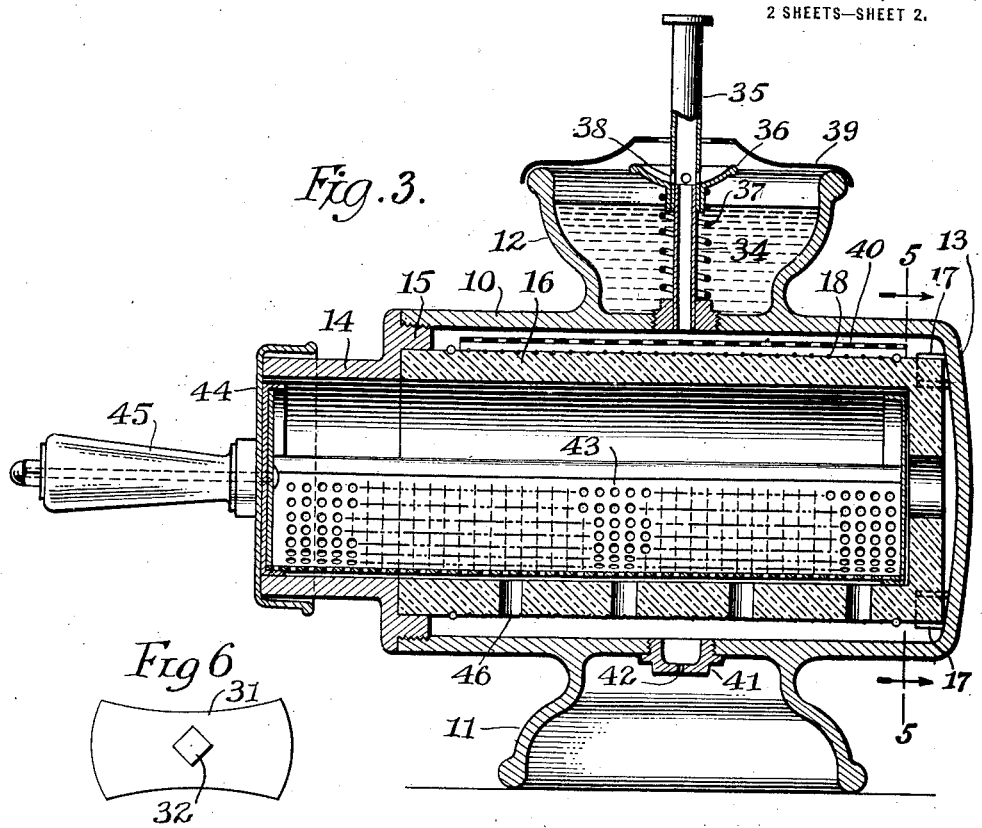
Fig. 3.
Fig. 6.
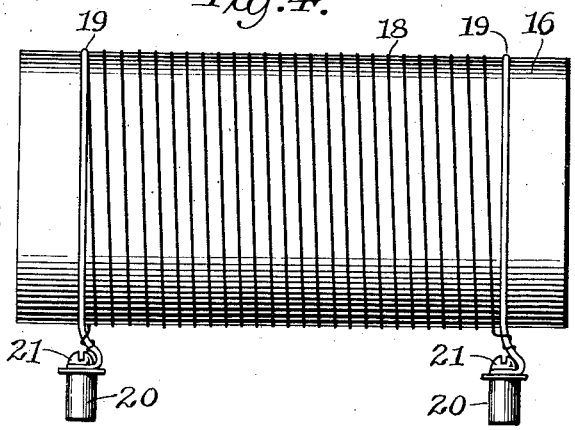
Fig. 4.
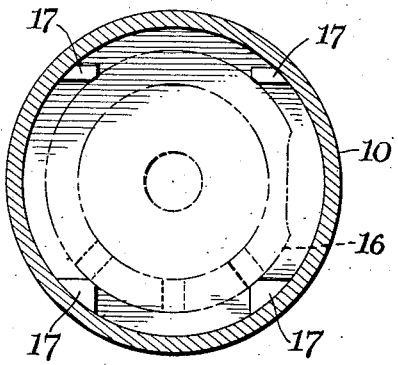
Fig. 5.
Inventor,
A. D. Pentz, Jr.,
By Kerr, Page, Cooper & Hayward
ATTORNEYS Patented Oct. 3, 1922.

1,430,925

UNITED STATES PATENT OFFICE.

ALBERT D. PENTZ, JR., OF NEW YORK, N. Y.

STERILIZER.

Application filed August 7, 1919. Serial No. 315,799.

*To all whom it may concern:*

Be it known that I, ALBERT D. PENTZ, Jr., a citizen of the United States, residing at New York, in the county of Richmond and State of New York, have invented certain new and useful Improvements in Sterilizers, of which the following is a full, clear, and exact description.

This invention relates to devices for sterilizing surgical instruments and other devices, and its chief object is to provide an efficient apparatus of simple and durable construction. To this and other ends the invention consists in the novel features of construction and combinations of elements hereinafter described.

The preferred embodiment of the invention is illustrated in the accompanying drawing, in which—

Figure 2A:
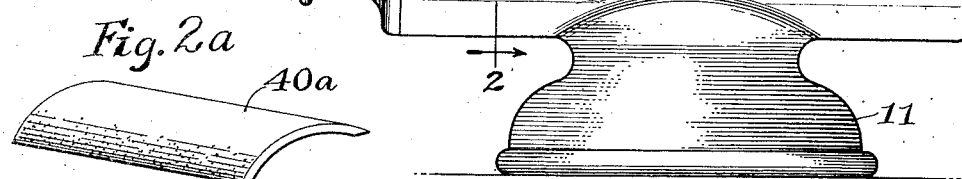
Fig. 2 is a cross section on line 2—2 of Fig. 1.
Figure 2:
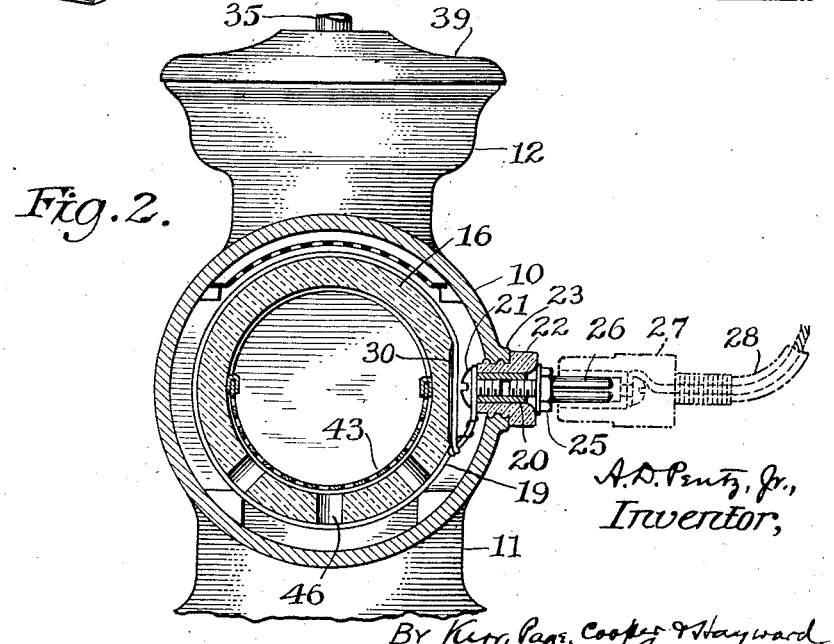

Fig. 2ª is a perspective view, on a slightly smaller scale, of the deflector or shield provided to receive the water which is to be converted into steam.

Fig. 3 is a vertical longitudinal section.

Fig. 4 is a detail plan view of the inner heating element.

Fig. 5 is a cross section on line 5—5 of Fig. 3.

Fig. 6 is a front view of a tool for use in removing the neck of the sterilizer.

The outer casing 10 is preferably cylindrical in form, arranged horizontally and provided with a foot or base 11. On top is a bowl or cup 12 forming a receptacle for water. The cylindrical portion, the base 11, bowl 12, and the closure 13 at the rear end, are preferably integral with each other, forming a single aluminum casting. In the front end is screwed a centrally operated closure having a neck 14, the threaded flange 15 serving also as the forward support for a centrally located heating element comprising a deep cylindrical cup 16 of porous earthenware of suitable dimensions. The open forward end of the heating element fits into the aforesaid flange 15, while its closed rear end is supported by lugs 17, Figs. 3 and 5, on the inside of the casing 10 and integral therewith.

Figure 1:
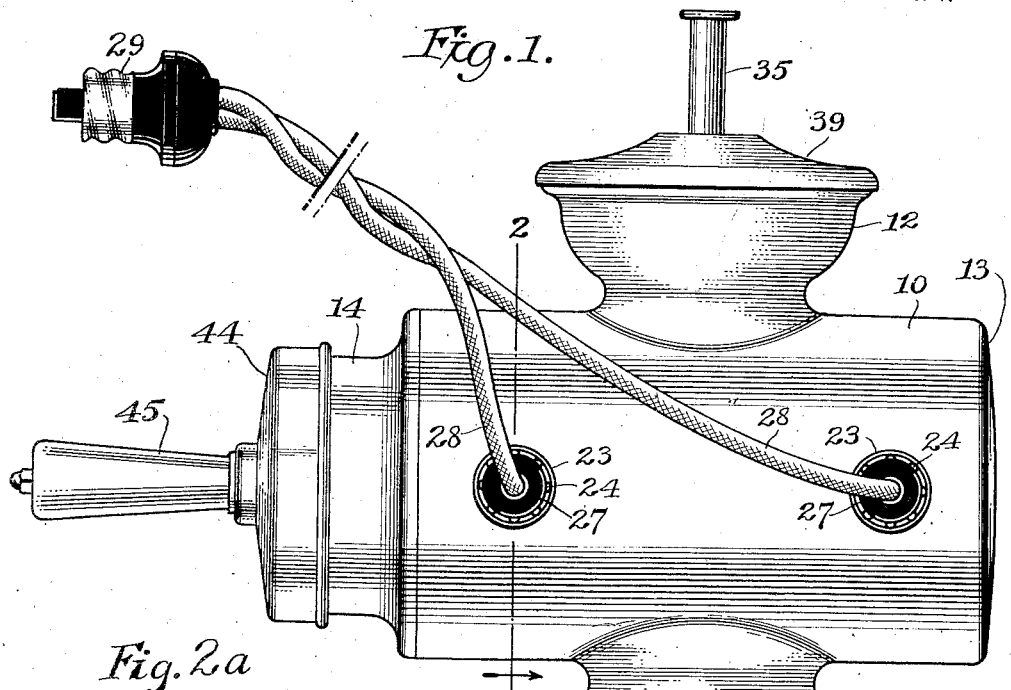
Fig. 1 is a side view of the complete apparatus.

Around the porous earthenware or stoneware cylinder 16 is an electrical heating resistance in the form of a helically wound resistance wire 18, connected at its ends to two conducting rings 19, which are themselves connected to a pair of short metal sleeves 20 by means of metal screws 21 threaded into the sleeves. See Figs. 2 and 4. The sleeves extend into insulating bushings 22 of porcelain or other suitable material, which are provided with shanks formed with threads screwing into internally threaded bosses 23 in one side of the casing 10. These bushings are ribbed on the outside, as indicated at 24, Fig. 1, for convenient grasp by the fingers in removal and replacement. The sleeves 20 are held firmly and securely in the bushings by metal screws 25. When the latter are set up, their heads bear against the outer ends of the bushings and the sleeves 20 are drawn into the bushings until the heads of the screws 21, or the bent ends of the conducting rings 19, bear against the inner ends of the bushings, as clearly shown in Fig. 2. This makes a very secure fastening, and which can be quickly and easily released by taking out the screws 25, whereupon the bushings 22 can be unscrewed, leaving the sleeves 20 loose in the apertured bosses 23. The neck 14 having been removed, the entire heating element can be removed through the front end of the casing 10. The screws are equipped at their outer ends with split metal pins 26 to receive the sockets 27 on the ends of the conductors 28. The latter are also connected to a suitable plug 29 for connection with a suitable source of current, as for example a lamp socket.

To provide ample room inside the shell or casing 10 for the inner ends of the bushings 22 and for the screw-heads 21, the adjacent side of the earthenware receptacle 16 may be slabbed off, as shown at 30, Fig. 2. To facilitate turning the neck 14 in removing and replacing the same, its inner contour is preferably made slightly oval or elliptical. A device 31, Fig. 6, having rounded ends, is adapted to fit the neck at its longer diameter. When this device is in place an ordinary wrench is applied to the squared stud 32, and the neck can then be easily unscrewed.

The bottom of the bowl or water receptacle 12 is provided with a removable screw-plug 33 carrying a vertical delivery tube 34 on which is a sliding tube 35 carrying at its lower end a cup 36. A coil spring 37 holds the cup and tube 35 normally in upper position. When the tube is depressed by the finger the cup fills with water; and upon release, the spring raises the cup to the normal position, allowing the water to run out through the apertures 38 and into the open delivery tube 34. A sheet metal cover 39, having a central aperture to receive the tube 35, may be placed over the bowl if desired.

The water delivered by the tube 34 may be received directly upon the heating element 16, but I prefer to provide a distributor 40, Fig. 3, between the tube and the heating element. The distributor or shield may be made of sheet metal, and if desired may be perforated, but I prefer to make it of porous earthenware, unperforated, as shown at 40$^a$, in Fig. 2$^a$. The shield is removably supported on the two upper lugs 17 at the rear of the casing 10 and on similar lugs, not shown, at the front end of the casing.

In the bottom of the casing is a recessed drain-plug 41, Fig. 3, threaded in place as shown, and having a small aperture 42 to permit the slow escape of any surplus water that may accumulate in the casing.

The instruments or other articles to be sterilized are carried in a removable drawer 43 of foraminous material, preferably sheet metal, having round ends and fitting loosely the inside of the heating element 16. At its outer end the drawer has a flanged cover 44 for the neck 14 and is provided with a handle 45.

In using the sterilizer the conductors 28 are connected with a source of current and the current is turned on. When the heating element and shield are well heated to temperature of, say, from 300° to 400° C. the tube 35 is depressed and allowed to rise again, thereby delivering a small quantity of water inside of the casing. Falling upon the highly heated shield the water is vaporized, filling the interior of the casing with steam, which enters the heating element 16 through the apertures 46 in the bottom thereof and thence passes into the drawer and into contact with the instruments therein. Being subjected to a temperature far above the boiling point of water at atmospheric pressure (which is substantially the pressure in the apparatus since it, the cover 44, fits the neck 14 loosely) the steam is superheated. The instruments, on the other hand, are at a temperature considerably below the boiling point. Coming into contact with the relatively cool instruments the superheated steam is immediately condensed, giving up its latent heat of condensation. This liberates a relatively large quantity of heat at the precise point where it is most effective, that is, on the surface of the instruments. The result is that any germs, bacilli, and other micro-organisms thereon are almost instantly killed, the time of complete sterilization being in most cases from five to ten seconds. Upon removing the drawer the instruments dry immediately and cool quickly to a safe temperature for use.

It is to be understood that the invention is not limited to the precise details herein illustrated and described, but can be embodied in other forms without departure from its spirit.

I claim:

1. In a sterilizer of the type described, a casing having an open end, an apertured closure removably fitted into the open end of the casing, and a hollow open-ended heating element inside the casing and having its open end supported by said closure.

2. In a sterilizer of the type described, a casing having an open end, an apertured closure removably fited in the open end of the casing, a hollow open-ended heating element inside the casing and spaced therefrom, having its open end supported by said closure, and means inside the casing for supporting the other end of said heating element.

3. In a sterilizer of the type described, a casing having an open end; a heating element in the casing, comprising a hollow open-ended insulating member of earthenware and a resistance wire encircling said member, arranged with its open end adjacent to the open end of the casing to receive the articles to be sterilized; and terminals for connection with a source of current, removably mounted in the side wall of the casing and connected with said resistance wire.

4. In a sterilizer of the type described, a casing having an open end; a hollow heating element inside the casing and having an open end adjacent to the open end of the casing; a shield inside of the casing and above the heating element; and means for delivering water into the casing and upon said shield.

5. In a sterilizer of the type described, a casing having an open end; a hollow heating element inside the casing and having an open end adjacent to the open end of the casing; a shield composed of porous earthenware arranged inside the casing and over the heating element; and means for delivering water into the casing and upon the shield.

6. In a sterilizer of the type described, a casing having an open end; an apertured closure having a circumferential flange threaded to said open end of the casing; a hollow heating element inside the casing and spaced from the walls thereof, and having one end fitted into said flange for support thereby; and lugs at the other end of the casing inside the same to support the adjacent end of the heating element.

In testimony whereof I affix my signature.

ALBERT D. PENTZ, Jr.